United States Patent
Dong et al.

(10) Patent No.: US 10,915,285 B2
(45) Date of Patent: Feb. 9, 2021

(54) MULTI-PURPOSE CONFERENCE TERMINAL

(71) Applicant: BOE TECHNOLOGY GROUP CO., LTD., Beijing (CN)

(72) Inventors: Youmei Dong, Beijing (CN); Jing Su, Beijing (CN); Xuewen Lv, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/599,984

(22) Filed: Oct. 11, 2019

(65) Prior Publication Data

US 2020/0042273 A1 Feb. 6, 2020

Related U.S. Application Data (63) Continuation of application No. 14/894,934, filed as application No. PCT/CN2015/078748 on May 12, 2015, now abandoned.

(30) Foreign Application Priority Data

Jan. 16, 2015 (CN) .................... 2015 2 0033291 U (51) Int. Cl.
  *G06F 3/14* (2006.01)
  *H04N 7/14* (2006.01)
  (Continued)

(52) U.S. Cl.
  CPC .......... *G06F 3/1423* (2013.01); *G06F 1/1641* (2013.01); *G06F 1/1652* (2013.01);
  (Continued)

(58) Field of Classification Search
  CPC combination set(s) only.
  See application file for complete search history.

(56) References Cited

U.S. PATENT DOCUMENTS

2006/0079277 A1  4/2006  Ditzik
2009/0296331 A1  12/2009  Choy
(Continued)

FOREIGN PATENT DOCUMENTS

CN  201408447 Y  2/2010
CN  201465443 U  5/2010
(Continued)

OTHER PUBLICATIONS

Office Action from U.S. Appl. No. 14/894,934 dated Apr. 7, 2017 (12 pages).
(Continued)

*Primary Examiner* — Temesghen Ghebretinsae
*Assistant Examiner* — Sosina Abebe
(74) *Attorney, Agent, or Firm* — Dave Law Group LLC; Raj S. Dave (57) ABSTRACT

The invention discloses a multi-purpose conference terminal. The multi-purpose conference terminal comprises: a display device and a bending structure provided on the display device, the display device comprising a first display area and a second display area, the bending structure being connected between the first display area and the second display area so that the first display area can be bent or flattened relative to the second display area. This invention improves the user experience of the multi-purpose conference terminal, provides ease of storage thereof, and saves the occupied storage space.

5 Claims, 7 Drawing Sheets

(51) Int. Cl.
*G06F 1/16* (2006.01)
*G06F 3/0488* (2013.01)
*H04N 7/15* (2006.01)

(52) U.S. Cl.
CPC .......... *G06F 1/1666* (2013.01); *G06F 1/1673* (2013.01); *G06F 1/1677* (2013.01); *G06F 3/04886* (2013.01); *H04N 7/142* (2013.01); *H04N 7/15* (2013.01); *G06F 1/1635* (2013.01); *G06F 1/1649* (2013.01); *G09G 2340/0492* (2013.01); *G09G 2380/02* (2013.01); *H04N 2007/145* (2013.01)

(56) References Cited

U.S. PATENT DOCUMENTS

| | | | |
|---|---|---|---|
| 2010/0085382 A1 | 4/2010 | Lundqvist et al. | |
| 2010/0182265 A1 | 7/2010 | Kim et al. | |
| 2010/0298032 A1 | 11/2010 | Lee et al. | |
| 2013/0229324 A1 | 9/2013 | Zhang et al. | |
| 2013/0309648 A1* | 11/2013 | Park | G09B 5/00 434/350 |
| 2013/0342090 A1 | 12/2013 | Ahn et al. | |
| 2014/0101577 A1* | 4/2014 | Kwak | G06F 3/1431 715/761 |
| 2014/0176429 A1 | 6/2014 | Hsieh | |
| 2015/0268730 A1 | 9/2015 | Walline et al. | |
| 2016/0065742 A1* | 3/2016 | Nasir | H04M 3/56 455/416 |
| 2016/0098063 A1 | 4/2016 | Lee et al. | |

FOREIGN PATENT DOCUMENTS

| | | |
|---|---|---|
| CN | 201611555 U | 10/2010 |
| CN | 201975015 U | 9/2011 |
| CN | 202110759 U | 1/2012 |
| CN | 202142257 U | 2/2012 |
| CN | 102467298 A | 5/2012 |
| CN | 102568312 A | 7/2012 |
| CN | 203164948 U | 8/2013 |
| CN | 103680091 A | 3/2014 |
| CN | 103680311 A | 3/2014 |
| CN | 203982702 U | 12/2014 |
| GB | 2360622 A | 9/2001 |

OTHER PUBLICATIONS

Office Action from U.S. Appl. No. 14/894,934 dated Nov. 2, 2017 (19 pages).
Office Action from U.S. Appl. No. 14/894,934 dated Mar. 28, 2018 (12 pages).
Office Action from U.S. Appl. No. 14/894,934 dated Oct. 15, 2018 (12 pages).
Office Action from U.S. Appl. No. 14/894,934 dated Jan. 10, 2019 (12 pages).
Office Action from U.S. Appl. No. 14/894,934 dated Jul. 11, 2019 (12 pages).
Extended European Search Report from European Application No. 15837221.9 dated Sep. 6, 2018 (12 pages).
Office Action from European Application No. 15837221.9 dated Sep. 6, 2019 (7 pages).

* cited by examiner

MULTI-PURPOSE CONFERENCE TERMINAL

CROSS-REFERENCE TO RELATED APPLICATIONS

This application is a continuation of U.S. patent application Ser. No. 14/894,934 filed Nov. 30, 2015, which is a National Stage of International Application No. PCT/CN2015/078748 filed May 12, 2015, which claims the benefit and priority of Chinese Application No. 201520033291.4 filed Jan. 16, 2015. The entire disclosures of the above applications are incorporated herein by reference.

TECHNICAL FIELD

The present invention relates to the display technical field, and in particular to a multi-purpose conference terminal.

BACKGROUND ART

At present, electronic table cards, as conference terminals, has begun to appear in various meetings. An existing electronic table card comprises a fixing frame and two display devices, the two display devices are both set in the fixing frame and are set relative to each other. Among them, one display device can be used to show participants information, and the other display device can be used to display conference-related information for conference participants to read.

However, existing electronic table cards have the following technical problems:

1) The structure of the fixing frame is fixed, and the positions of the two display devices are fixed, so the placement angle of each display device is also fixed, and the display area of a single display device installed in the fixing frame is limited, thus negatively affecting conference participants' operations;

2) Since the two display devices are installed in the fixing frame, and the structure of the fixing frame is fixed, when the number of the electronic table cards used in the conference is large, this is not conducive to storage of the multiple electronic table cards, and to store the multiple electronic table cards will take up a lot of space.

SUMMARY OF THE INVENTION

The present invention provides a versatile conference terminal, which can improve the user experience of the multi-purpose conference terminal, provide ease of storage thereof, and save the occupied storage space.

To achieve the above purpose, this invention provides a multi-purpose conference terminal, comprising: a display device and a bending structure provided on the display device, the display device comprising a first display area and a second display area, the bending structure being connected between the first display area and the second display area so that the first display area can be bent or flattened relative to the second display area.

Optionally, when the first display area is bent relative to the second display area, the first display area and the second display area display information contents independently of each other; and when the first display area is flattened relative to the second display area, the first display area and the display area is combined as one display area.

Optionally, when the first display area is flattened relative to the second display area, there is a set distance between the bending structure and the display device's display surface.

Optionally, the display device is a flexible display, and the first display area and the second display area are formed integrally.

Optionally, the multi-purpose conference terminal further comprises a frame for fixing the display device, the frame comprising a first sub-frame and a second sub-frame, the first display area is set in the first sub-frame, and the second display area is set in the second sub-frame.

Optionally, the multi-purpose conference terminal further comprises a foldable keyboard movably connected with the first display area, for protecting the first display area in a folded state, and for use by a conference participant in an expanded state.

Optionally, the multi-purpose conference terminal further comprises: a projector, a first control module and a sensing device; the projector being for projecting a virtual keyboard on the placement surface where the multi-purpose conference terminal is placed; the sensing device being for identifying operations of a conference participant on the projected virtual keyboard; and the first control module being for mapping one-to-one the operations of the conference participant to specific input characters or commands.

Optionally, the multi-purpose conference terminal further comprises a protection board movably connected with the display device; the protection board being for protecting the first display area or the second display area in a folded state.

Optionally, the protection board is provided with a charging module for supplying power to the multi-purpose conference terminal in real time.

Optionally, the multi-purpose conference terminal further comprises: a second control module, a first gravity sensor operating synchronously with the first display area and a second gravity sensor operating synchronously with the second display area;

the first gravity sensor being for detecting the direction of the plane of the first display area;

the second gravity sensor being for detecting the direction of the plane of the second display area;

the second control module being for determining whether the angle between the direction of the plane of the first display area and the direction of the plane of the second display area is greater than or equal to a set threshold, and if determining that the angle is greater than or equal to the threshold, controlling so that the first display area and the second display area display the information contents in opposite directions, and if determining that the angle is less than the set threshold, controlling so that the first display area and the second display area display the information contents in the same direction.

The invention has the following advantages: the present invention provides a multi-purpose conference terminal, in which the two display areas of the display device can be bent or flattened relative to each other through a bending structure; in addition, the first display area and the second display area can display the information contents independently in a bent state and be combined into one display area in a flattened state. Therefore, the user experience of the multi-purpose conference terminal is improved, ease of storage thereof is provided, and the occupied storage space is saved.

DETAILED DESCRIPTION OF SPECIFIC EMBODIMENTS

For those skilled in the art to better understand the technical solution of the invention, a multi-purpose conference terminal provided by the present invention provides is described below in more detail in conjunction with the accompanying drawings.

Figure 1:
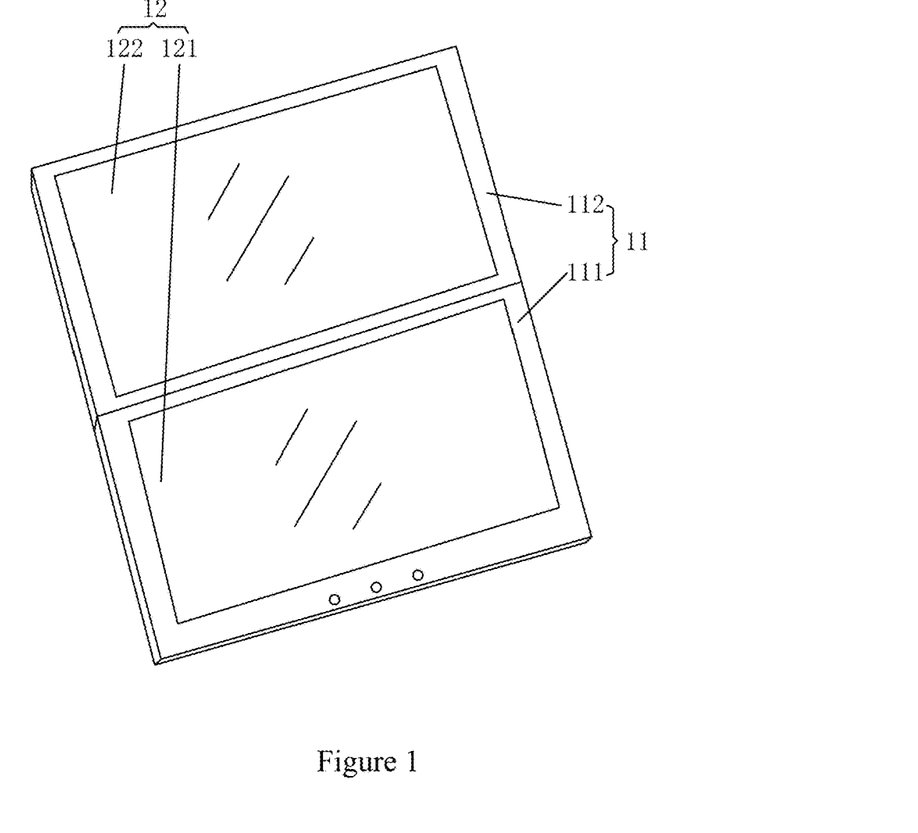
FIG. 1 is a schematic diagram of a multi-purpose conference terminal provided by a first embodiment of the present invention.

FIG. 1 is a schematic diagram of a multi-purpose conference terminal provided by a first embodiment of the present invention. As shown in FIG. 1, the multi-purpose conference terminal comprises: a display device 12 and a bending structure set on the display device 12 (see the bending structures 13 in FIG. 3 or FIG. 10). The display device 12 comprises a first display area 121 and a second display area 122. The bending structure is connected between the first display area 121 and the second display area 122 and 121, so that the first display area 121 can be bent or flattened relative to the second display area 122. In other words, the first display area 121 is movably connected with the second display area of 122 through the bending structure.

Figure 2:
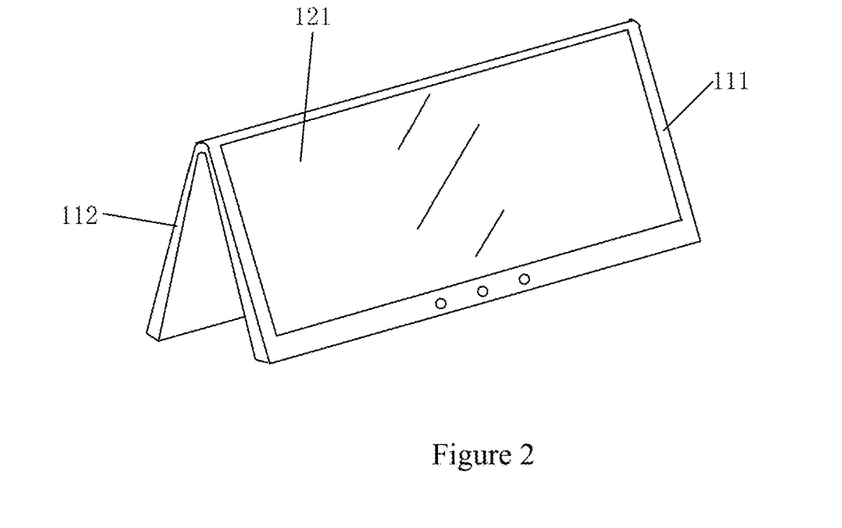
FIG. 2 is a schematic diagram of the multi-purpose conference terminal in FIG. 1 in a bent state.

FIG. 2 is a schematic diagram of a bent state of the multi-purpose conference terminal in FIG. 1. As shown in FIG. 2, when the first display area 121 is bent relative to the second display area 122, the multi-purpose conference terminal can be placed on the placement surface through the support of the first display area 121 and the second display area 122 bent relative to each other. At this time the first display area 121 and the second display area 122 display information contents independently of each other. The angle between the plane of the first display area 121 and the plane of the second display area 122 can be a set angle. The information contents may comprise first information contents and second information contents. The first display area 121 can be used to display the first information contents. The first information contents may be conference-related information, such as the conference schedule or contents to be presented. The second display area 122 can be used to display second information contents. The second information contents may be, for example, the participants' names, positions and other information. At this point, the multi-purpose conference terminal can be used as an electronic table card for use by the conference participants, wherein the placement surface may be a desktop. The display device 12 may include a frameless display device and a framed display device. In this embodiment, the display device 12 is a framed display device, thus the multi-purpose conference terminal further comprises a frame 11 for fixing the display device 12, with the display device 12 set within the frame 11. Optionally, the part of the frame 11 to be in contact with the placement surface when the multi-purpose conference terminal is in the bent state is provided with an anti-slip mat (not shown in the Figure), so that when being placed on the placement surface such as a desktop, the bent posture of the multi-purpose conference terminal can remain stable.

As shown in FIG. 1, when the multi-purpose conference terminal is flattened, the first display area of 121 and the second display area 122 can be combined into one display area so that the multi-purpose conference terminal can be used as a tablet-type portable electronic device, such as a tablet computer. Preferably, the bending structure is configured to make the first display area 121 and the second display area 122 to be in the same plane when the multi-purpose conference terminal is in the flattened state, so that the first display area 121 and the second display area 122 are merged into one display area to display a full picture together, thus the multi-purpose conference terminal can have a larger display area and can display more contents in a display area. At this time, the conference participant can hold in hand and operate the multi-purpose conference terminal at any angle.

Figure 3:
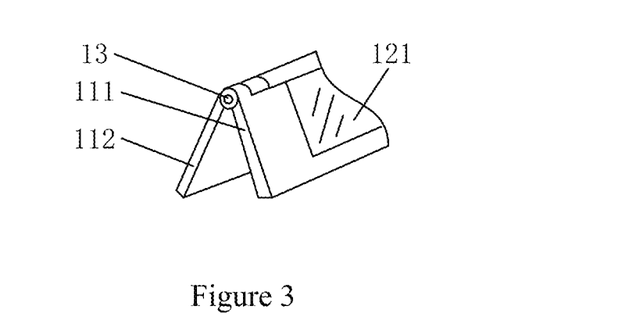
FIG. 3 is a schematic diagram of the bending structure of the multi-purpose conference terminal in FIG. 2.

FIG. 3 is a schematic diagram of the bending structure of the multi-purpose conference terminal in FIG. 2. As shown in FIG. 3, the bending structure 13 is between the first display area 121 and the second display area 122. In this embodiment, the bending structure 13 is set on the frame 11. The bending structure 13 is a structure that can make the multi-purpose conference terminal collapse. Preferably, the bending structure 13 is a hinge. Or, the bending structure for example can also be two pieces of rigid plates connected with a flexible material. Or, the bending structure can be composed of multiple sections of rigid parts nested together that can change positions relative to each other, for example similar to a flexible arm lamp. The rigid parts of the bending structure can be fixed to the display device by various means such as adhesion, buckle, embedding etc.

In this embodiment, the frame 11 comprises a first sub-frame 111 and a second sub-frame 112. The first display area 121 is set in the first sub-frame 111, and the second display area 122 is set in the second sub-frame 112. The first display area 121 and the second display area 122 are two separate displays, which may be a variety of types of display, such as electronic paper displays, LCD or OLED displays, etc.

Preferably, the multi-purpose conference terminal may further comprise: a second control module, a first gravity sensor operating synchronously with the first display area 121, and a second gravity sensor operating synchronously with the second display area 122. For example, the first gravity sensor can be set on the top edge of the first display area 121, and the second gravity sensor can be set on the top edge of the second display area 122. As shown in FIG. 3, the top edge of the first display area 121 and the top edge of second display area 122 are the upper edge of the first display area 121 and the second display area 122 when the multi-purpose conference terminal is bent and placed normally on the placement surface, that is, their respective edges connected by the bending structure. The second control module, the first gravity sensor and the second gravity sensor are not shown in the Figure.

The gravity sensor can sense the angle between its own set direction and that of gravity. The first gravity sensor and the second gravity sensor are fixed to and can operate synchronously with the first display area and the second display area respectively, thus the first gravity sensor is for detecting the direction of the plane of the first display area 121, and the second gravity sensor is for detecting the direction of the plane of the second display area of 122.

The control circuit is used to determine whether the angle between the direction of the plane of the first display area 121 and the direction of the plane of the second display area 122 is greater than or equal to a set threshold. If determining that the angle is greater than or equal to the set threshold, the control circuit controls so that the information contents shown on the first display area 121 and the second display area 122 are displayed in opposite directions; if determining that the angle is less than the set threshold, the control circuit controls so that the information contents shown on the first display area 121 and the second display area 122 are displayed in the same direction. Specifically, the direction of the plane of the first display area 121 can be represented by the direction of the normal line of the plane of the first display area 121, and the direction of the plane of the second display area 122 can be represented by the direction of the normal line of the plane of the second display area 122. The threshold can be set to any value between 0° to 180°; preferably, the threshold can be set to any value between 90° to 160°. When the second control module determines that the angle is greater than or equal to the set threshold, the multi-purpose conference terminal is in a bent state. At this time, the multi-purpose conference terminal is as an electronic table card for use by conference participants. Correspondingly, the control circuit makes the first display area 121 and the second display area 122 to display information contents in opposite directions and to display different information contents, so that the conference participant using the multi-purpose conference terminal and other conference participants can view the information contents on the first display area 121 and the second display area 122 respectively. Here, "display . . . in opposite directions" refers to that the top (upper edge) of the information contents displayed on the first display area 121 and that on the second display area 122 are both near the bending structure, so that when the bent multi-purpose conference terminal is placed normally on a placement surface, the screens shown on the first display area 121 and on the second display area 122 respectively are both upright. When the second control module determines that the angle is less than the set threshold, the multi-purpose conference terminal is close to or in a flattened state. At this time, the multi-purpose conference terminal can be used as a portable flat panel electronic device such as a tablet by conference participants. At this time, the first display area 121 and the second display area 122 are treated as one display area. The second control module will make the information contents shown on the first display area 121 and those on the second display area 122 to be displayed in the same direction, showing different parts of the same screen. Here, "displayed in the same direction" refers to that the second control module controls so that the screen shown on the first display area 121 and the screen shown on the second display area 122 form a complete screen, so that conference participants can view the information contents displayed continuously on the multi-purpose conference terminal.

Figure 4:
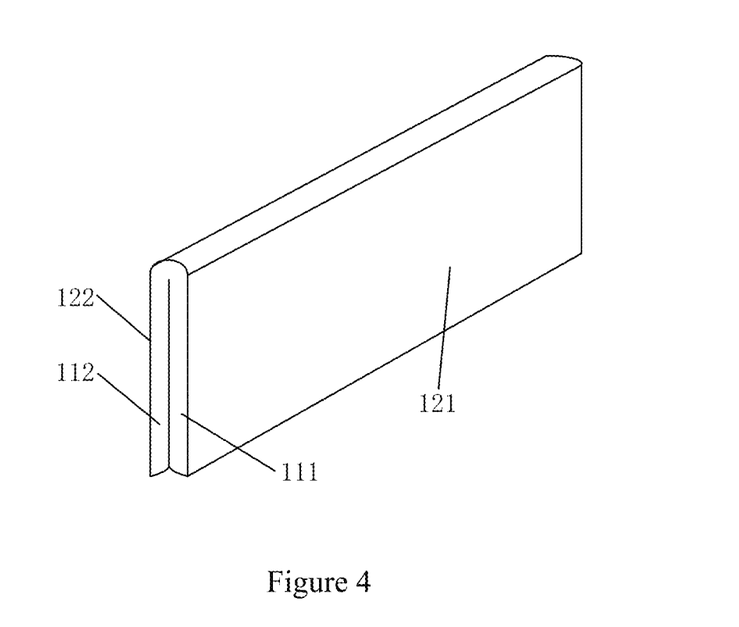
FIG. 4 is a schematic diagram of the multi-purpose conference terminal in FIG. 1 in a folded state.

FIG. 4 is a schematic diagram of the multi-purpose conference terminal in FIG. 1 in the folded state. As shown in FIG. 4, when the multi-purpose conference terminal needs to be stored, with the direction of the plane of the first display area 121 being represented by the direction of the normal line of the plane of first display area 121, and the direction of the plane of the second display area 122 being represented by the direction of the normal line of the plane of second display area 122, through the bending structure, for example, the angle between the direction of the plane of the first display area 121 and the direction of the plane of the second display area may be adjusted to 180°, that is, the backs of the first display area 121 and the second display area 122 fully fit together. By providing the bending structure, collapsing of the multi-purpose conference terminal is realized, and such collapsing can save the occupied storage space.

The embodiment provides a multi-purpose conference terminal which can shift between bent and flattened states through a bending structure. When the multi-purpose conference terminal is in a bent state, the first display area and the second display area may be made to display information independently of each other, and when the multi-purpose conference terminal is in a flattened state, the first display area and the second display area may be made to form one display area, thus improving the user experience of the multi-purpose conference terminal, providing ease of storage thereof, and saving the occupied storage space.

Figure 5:
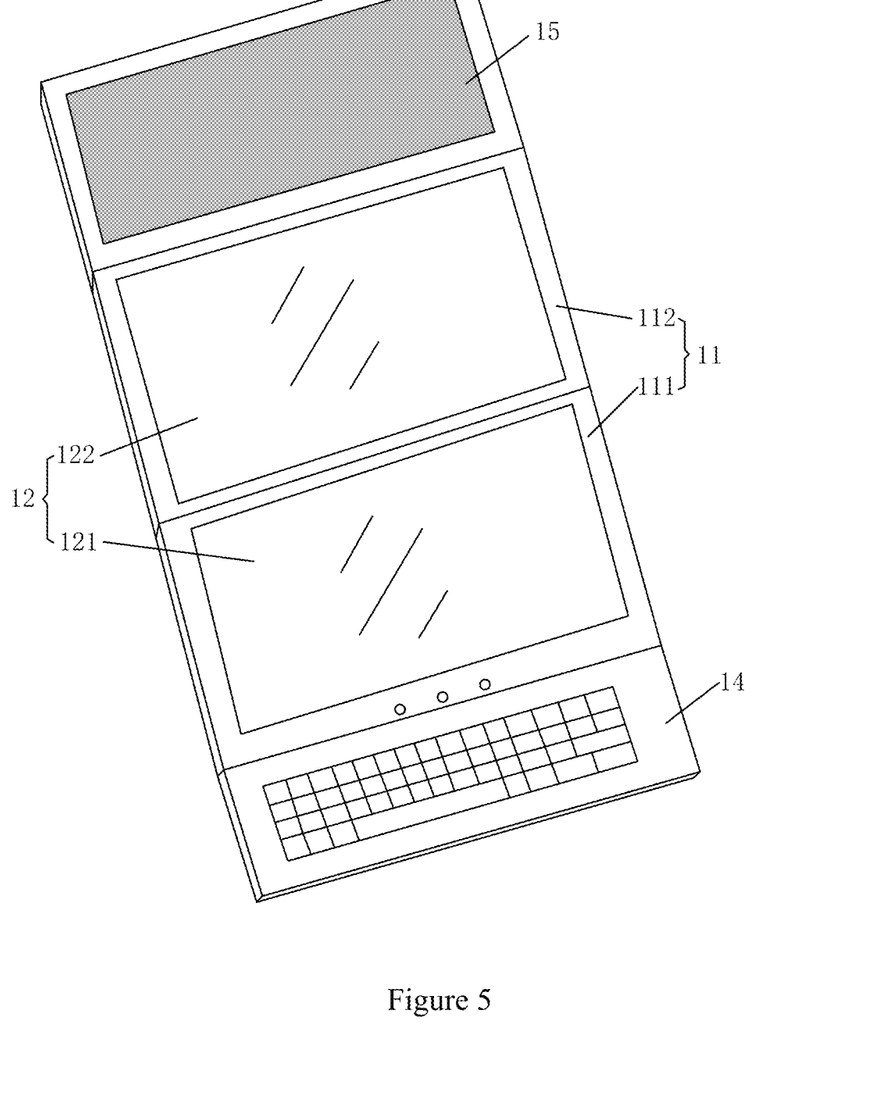
FIG. 5 is a schematic diagram of a multi-purpose conference terminal provided by a second embodiment of the present invention.
Figure 6:
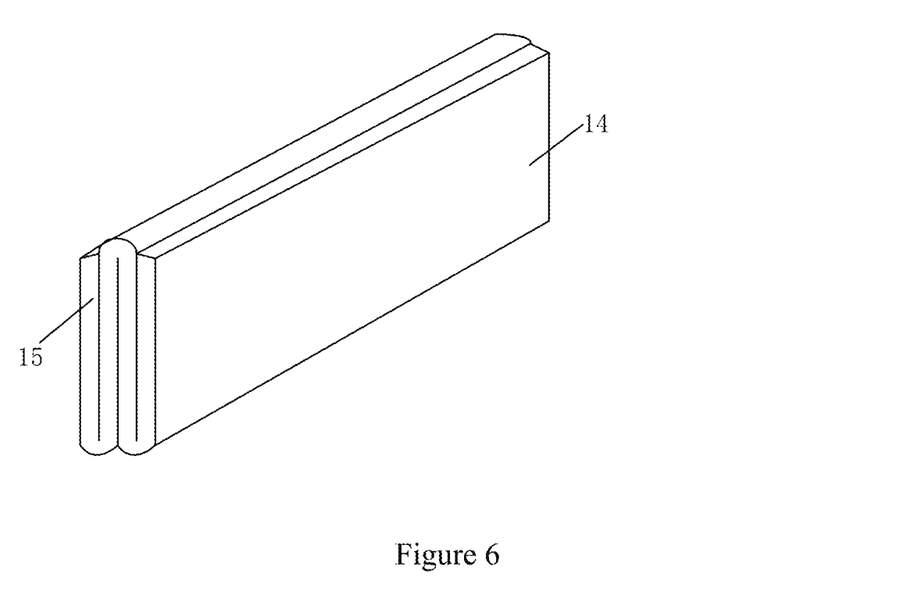
FIG. 6 is a schematic diagram of a folded state of the multi-purpose conference terminal in FIG. 5.
Figure 7:
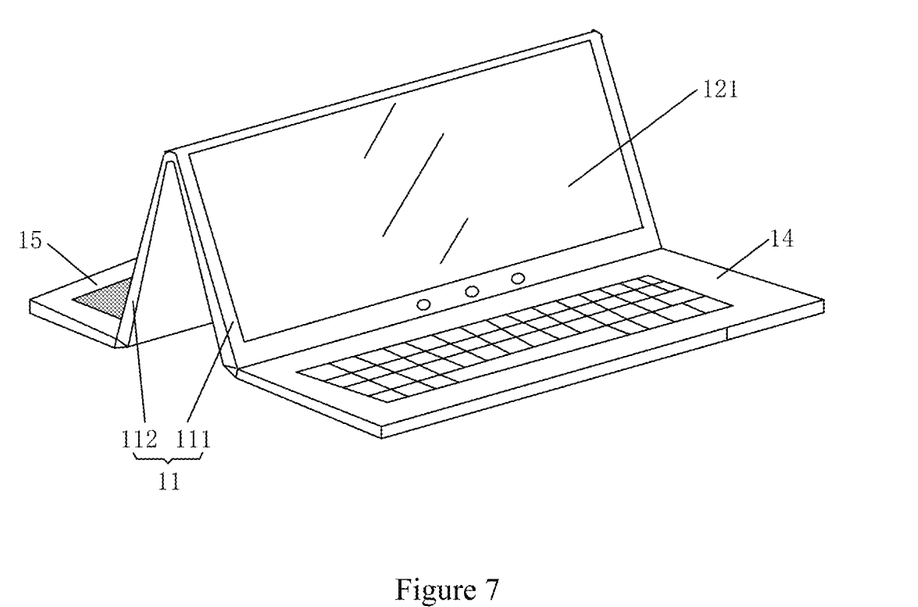
FIG. 7 is a schematic diagram of a use state of the multi-purpose conference terminal in FIG. 5.

FIG. 5 is a schematic diagram of a multi-purpose conference terminal provided by a second embodiment of the present invention. FIG. 6 is a schematic diagram of the multi-purpose conference terminal in FIG. 5 in a folded state. As shown in FIG. 5 and FIG. 6, in this embodiment, based on the first embodiment described above, the multi-purpose conference terminal may further comprise: a foldable keyboard 14 movably connected with the first display area 121. In this embodiment, the foldable keyboard 14 is movably connected with the frame near the first display area 121 in order to achieve movable connection with the first display area 121. Specifically, the foldable keyboard 14 is movably connected with the first sub-frame 111. As shown in FIG. 6, the foldable keyboard 14 is for protecting the first display area 121 when in a folded state. When the multi-purpose conference terminal is folded, the front side of the first display area 121 faces outwards, and the foldable keyboard 14 cover the front side of the first display area 121 after being folded, thus protecting the first display area 121. FIG. 7 is a schematic diagram of the multi-purpose conference terminal in FIG. 5 in use state. As shown in FIG. 7, the foldable keyboard 14 is for use in an expanded state by a conference participant; and when it is needed to use the multi-purpose conference terminal, the foldable keyboard 14 can be expanded and placed flat on the placement surface to allow the conference participant to use the foldable keyboard 14.

As shown in FIG. 5 to FIG. 7, optionally, the multi-purpose conference terminal may also comprise: a protection board 15 movably connected with the display device 12. The protection board 15 is used to protect the first display area 121 or the second display area 122 in the folded state. In this embodiment, the number of the protection board 15 is one, and the protection board 15 is movably connected with the frame near the second display area 122. Specifically, the protection board 15 is movably connected with the second sub-frame 112. When the multi-purpose conference terminal is folded, the front side of the second display area 122 faces outward, and the protection board 15 will cover the front side of the second display area 122, so as to realize protection of the second display area 122. When the multi-purpose conference terminal needs to be used, the protection board 15 is expanded, 15 and placed flat on the placement surface.

In practical applications, optionally, the number of the protection boards 15 may also be two, among which, one protection board 15 is for protecting the first display area 121 in the folded state, the other protection board 15 is for protecting the second display area 122 in the folded state. More preferably, the foldable keyboard 14 may be set on the protection board 15.

Optionally, a charging module may also be set on the protection board 15, the charging module can be used for providing power to the multi-purpose conference terminal in real time.

In practical applications, as an alternative to the foldable keyboard 14, the multi-purpose conference terminal may comprise a projector, a first control module and a sensing device. The projector may be set on the multi-purpose conference terminal, such as on the display device 12. The projector is for projecting a virtual keyboard on the placement surface. The sensing device is for identifying operations of conference participants on the projected virtual keyboard. The first control module is for mapping one-to-one the operations of the conference participants to specific input characters or instructions, thus obtaining the information input by the conference participants. The technology of projecting an image of a keyboard on a surface such as a placement surface to realize the functions of real keyboard is known. The virtual keyboard may also be called a projected keyboard. For example, it is an image of a standard keyboard projected on a surface of an object using a red laser transmitter, and the infra-red technology may be used to track finger movements to obtain the input information. The projector, the first control module and the sensing device are not shown in the schematic diagram.

In this embodiment, the multi-purpose conference terminal can switch between the bent and flattened state through the setting of the bending structure. When the multi-purpose conference terminal is in the bent state, the first display area and the second display area can display information contents independently of each other. When the multi-purpose conference terminal is in the flattened state, the first display area and the second display area can be combined into one display area, thus improving the user experience of the multi-purpose conference terminal, providing ease of storage thereof, and saving the occupied storage space. When the multi-purpose conference terminal is in the flattened state, conference participants can operate the multi-purpose conference terminal as a handheld tablet electronic device, such as a tablet computer, and can change the angle of holding the electronic device at will.

Figure 8:
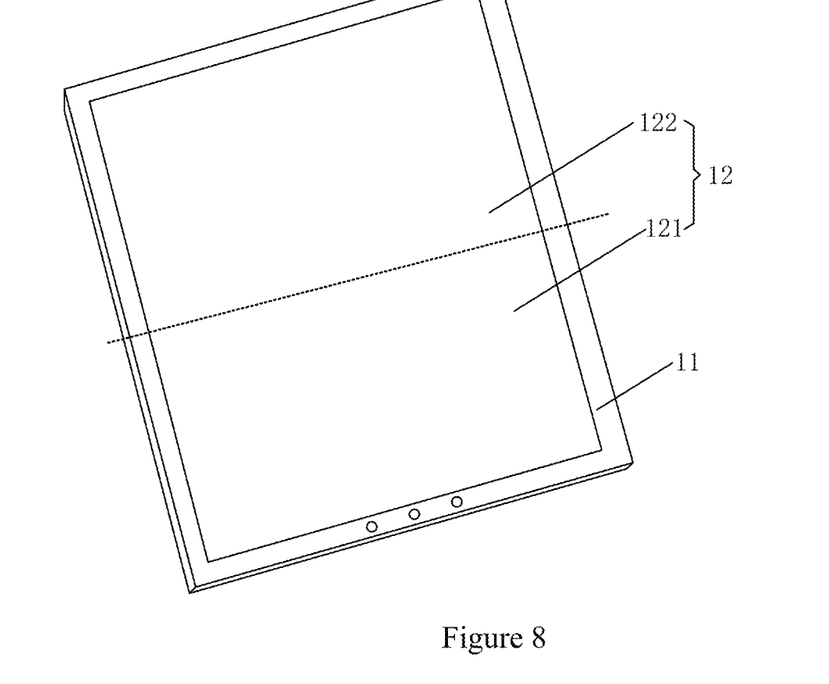
FIG. 8 is schematic diagram of a multi-purpose conference terminal provided by a third embodiment of the present invention.

FIG. 8 is a schematic diagram of a multi-purpose conference terminal provided by a third embodiment of the present invention. As shown in FIG. 8, the multi-purpose conference terminal comprises: a display device 12 and a bending structure set on the display device 12, the display device 12 comprising a first display area 121 and a second display area 122. The bending structure is set between the first display area 121 and the second display area 122, so that the first display area 121 can be bent or flattened relative to the second display area 122.

In this embodiment, the display device 12 is a flexible display, and the first display area 121 and the second display area 122 are formed integrally.

Figure 9:
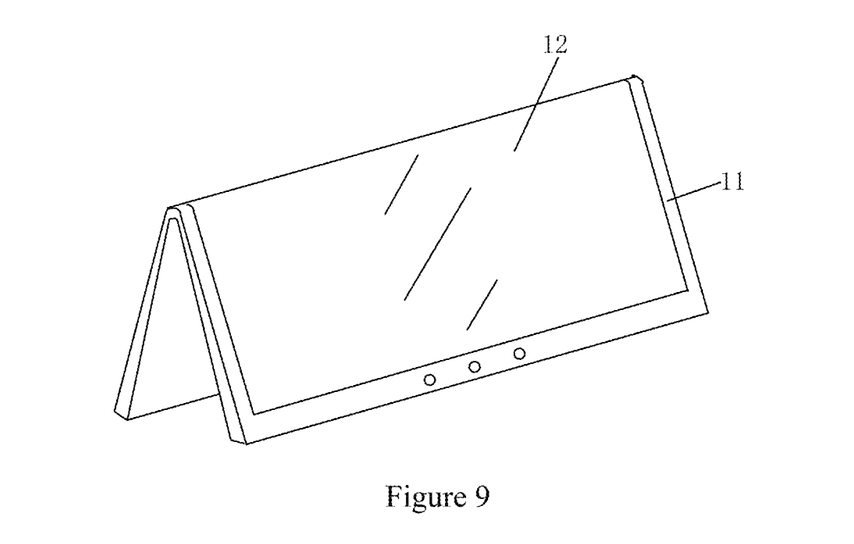
FIG. 9 schematic diagram of a bent state of the multi-purpose conference terminal in FIG. 8.

FIG. 9 is a schematic diagram of the multi-purpose conference terminal in FIG. 8 in the bent state. As shown in FIG. 9, when the multi-purpose conference terminal is in the state bent, the multi-purpose conference terminal is placed on the placement surface through the support of the outer edges of the first display area 121 and the second display area 122. At this time the first display area 121 and the second display area 122 can display information contents independently of each other. The angle between the plane of the first display area 121 and the plane of the second display area 122 can be a set angle. The information contents may comprise first information contents and second information contents, the first display area 121 can be used to display the first information contents, which may be conference-related information, such as a conference schedule or contents to be presented. The second display area 122 can be used to display second information contents, such as the participants' names, positions and other information. At this time, the multi-purpose conference terminal can be used as an electronic table card for use by conference participants, wherein the placement surface may be the desktop. The display device 12 may include a frameless display device or a framed display device. In this embodiment, the display device 12 is a framed display device, so the multi-purpose conference terminal further comprises a frame 11 for fixing the display device 12, with the display device 12 set within the frame 11. Optionally, the part of the frame 11 for contacting with the placement surface when the multi-purpose conference terminal is in the bent state is provided with an anti-slip mat (not shown in the Figure), so that when the multi-purpose conference terminal is placed on the placement surface such as a desktop, the multi-purpose conference terminal's bent posture can remain stable.

As shown in FIG. 8, when the multi-purpose conference terminal is in the flattened state, the first display area of 121 and the second display area 122 form into one display area, so that the multi-purpose conference terminal can be used as a tablet-type portable electronic device, such as a tablet computer. Preferably, the bending structure is configured to make the first display area 121 and the second display area 122 to be in the same plane when the multi-purpose conference terminal is in the flat state, so that the first display area 121 and the second display area 122 are merged into one display area to collectively display a full screen, thus enabling the multi-purpose conference terminal to have a larger display area and can display more contents in a display area. At this time, the conference participant can hold the multi-purpose conference terminal at any angle to operate it.

Figure 10:
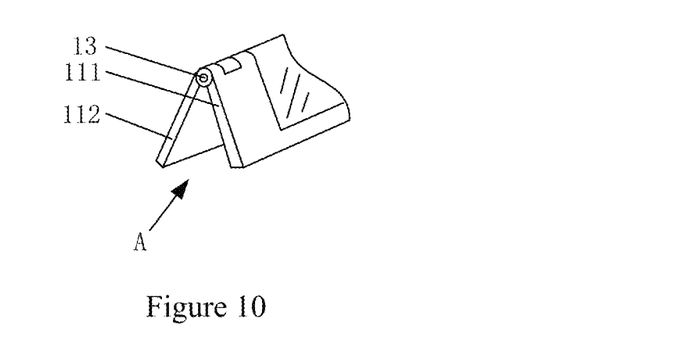
FIG. 10 is a schematic diagram of the bending structure of the multi-purpose conference terminal in FIG. 8.
Figure 11:
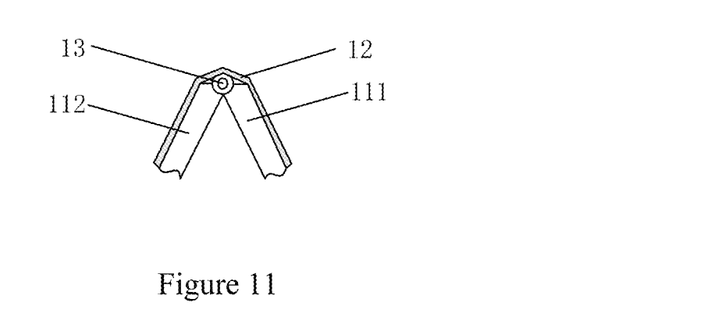
FIG. 11 is a view in direction A of the bending structure of the multi-purpose conference terminal in FIG. 10.
Figure 12:
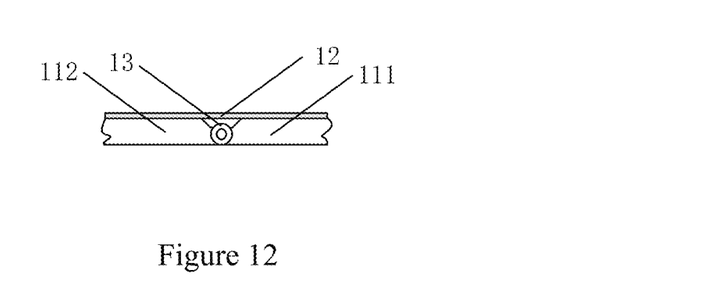
FIG. 12 is a section view of the flattened state of the multi-purpose conference terminal in FIG. 8.

FIG. 10 is a schematic diagram of the bending structure of the multi-purpose conference terminal in FIG. 8, FIG. 11 is a view in direction A of the bending structure of the multi-purpose conference terminal in FIG. 10, and FIG. 12 is a sectional view of the multi-purpose conference terminal in FIG. 8 in the flattened state. As shown in FIGS. 10 through 12, the bending structure 13 is between the first display area 121 and the second display area 122. The bending structure 13 in this embodiment is set on the frame 11. The bending structure 13 is a structure that can make the multi-purpose conference terminal folded. Preferably, the bending structure 13 is a hinge. Using a hinge ensures that the flexible display can be bent at a preset position, rather than being bent into an arch-shape randomly, thus facilitating bending the multi-purpose conference terminal into a stand type needed. Or, the bending structure can also be two pieces of rigid plates connected with flexible material, for example. Or, the bending structure can be composed of multiple sections of rigid parts nested together that can change positions relative to each other, for example similar to a flexible arm lamp. The rigid parts of the bending structure may be fixed to the display device through various means such as adhesion, buckle, embedding etc.

The bending structure 13 can be set to have a set distance with the display surface of the display device 12 when the multi-purpose conference terminal is in the flattened state. That is, as shown in FIG. 12, the display surface of the display device 12 is higher than the highest point of the bending structure 13, so that when the multi-purpose conference terminal is in a bent state, there is a clearance between the display surface of the display device 12 and the bending structure 13, to avoid damage caused to the screen (i.e., display surface) of the display device and displayed picture distortion due to big tension.

Preferably, the multi-purpose conference terminal may further comprise: a second control module, a first gravity sensor operating synchronously with the first display area 121, and a second gravity sensor operating synchronously with the second display area 122. For example, the first gravity sensor can be set on the top edge of the first display area 121, and the second gravity sensor can be set on the top edge of the second display area 122. As shown in FIG. 3, the top edges of the first display area 121 and the second display area 122 refer to the upper edges of the first display area 121 and the second display area 122 when the multi-purpose conference terminal is bent and placed normally on the placement surface, that is, their respective edges connected through the bending structure. The second control module, the first gravity sensor and the second gravity sensor are not shown in the schematic diagram.

The gravity sensors can sense the angles between their own set directions and the direction of gravity. The first gravity sensor and the second gravity sensor remain fixed to the first display area and the second display area and can operate synchronously therewith respectively, thus the first gravity sensor is for detecting the direction of the plane of the first display area 121, and the second gravity sensor is for detecting the direction of the plane of the second display area 122.

The control circuit is used to determine whether the angle between the direction of the plane of the first display area 121 and the direction of the plane of the second display area 122 is greater than or equal to a set threshold. If determining that the angle is greater than or equal to the set threshold, the control circuit controls so that the information contents shown on the first display area 121 and the second display area 122 are displayed in opposite directions; if determining that the angle is less than the set threshold, the control circuit controls so that the information contents shown on the first display area 121 and the second display area 122 are displayed in the same direction. Specifically, the direction of the plane of the first display area 121 can be represented by the direction of the normal line of the plane of the first display area 121, and the direction of the plane of the second display area 122 can be represented by the direction of the normal line of the plane of the second display area 122. The threshold can be set to any value between 0° to 180°; preferably, the threshold can be set to any value between 90° to 160°. When the second control module determines that the angle is greater than or equal to the set threshold, the multi-purpose conference terminal is in a bent state. At this time, the multi-purpose conference terminal is as an electronic table card for use by conference participants. Correspondingly, the control circuit makes the first display area 121 and the second display area 122 to display information contents in opposite directions and to display different information contents, so that the conference participant using the multi-purpose conference terminal and other conference participants can view the information contents on the first display area 121 and the second display area 122 respectively. Here, "display . . . in opposite directions" refers to that the top (upper edge) of the information contents displayed on the first display area 121 and that on the second display area 122 are both near the bending structure, so that when the bent multi-purpose conference terminal is placed normally on a placement surface, the screens shown on the first display area 121 and on the second display area 122 respectively are both upright. When the second control module determines that the angle is less than the set threshold, the multi-purpose conference terminal is close to or in a flattened state. At this time, the multi-purpose conference terminal can be used as a portable flat panel electronic device such as a tablet by conference participants. At this time, the first display area 121 and the second display area 122 are treated as one display area. The second control module will make the information contents shown on the first display area 121 and those on the second display area 122 to be displayed in the same direction, showing different parts of the same screen. Here, "displayed in the same direction" refers to that the second control module controls so that the screen shown on the first display area 121 and the screen shown on the second display area 122 form a complete screen, so that conference participants can view the information contents displayed continuously on the multi-purpose conference terminal.

Optionally, the multi-purpose conference terminal in the embodiment may also comprise a foldable keyboard, a detailed description of which may be found in the above description of the second embodiment.

Optionally, the multi-purpose conference terminal in the embodiment of may also comprise a protection board, a detailed description of which may be found in the above description of the second embodiment.

Optionally, the multi-purpose conference terminal in the embodiment may also comprise a projector for projecting a virtual keyboard on the placement surface, a detailed description of which virtual keyboard may be found in the above description of the second embodiment.

A description of the folded state of the multi-purpose conference terminal in this embodiment may be found in the above description of the first embodiment or the second embodiment, and will not be repeated here.

In this embodiment, the multi-purpose conference terminal can switch between the bent and flattened state through the bending structure. When the multi-purpose conference terminal is in the bent state, the first display area and the second display area can display information contents independently of each other. When the multi-purpose conference terminal is in the flattened state, the first display area and the second display area can be combined into one display area, thus improving the user experience of the multi-purpose conference terminal, providing ease of storage thereof, and saving the occupied storage space. When the multi-purpose conference terminal is in the flattened state, the multi-purpose conference terminal can be operated as a handheld tablet electronic device, such as a tablet computer, and conference participants can change the angle of holding the electronic device at will.

The multi-purpose conference terminal provided by the present invention may have applications as follows.

Figure 13:
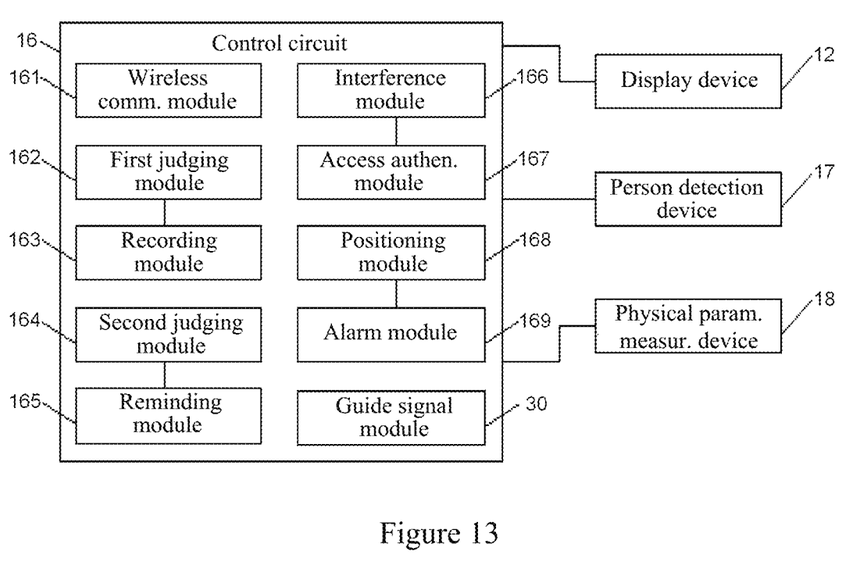
FIG. 13 is an exemplary functional block diagram of the multi-purpose conference terminal provided by the invention.

FIG. 13 is a schematic functional block diagram of the multi-purpose conference terminal provided by the invention. As shown in FIG. 13, each multi-purpose conference terminal corresponds to a specific conference participant. The multi-purpose conference terminal may comprise a display device 12 and a control circuit 16, the control circuit 16 may comprise a wireless communication module 161, and the multi-purpose conference terminal may communicate with a mobile terminal of a conference participant through the wireless communication module 161.

In this embodiment, the wireless communication module 161 may comprise a call module, a SMS module, a Bluetooth module, an infrared module, a GPRS (General Packet Radio Service) access module or a WIFI module. Accordingly, the mobile terminal of the conference participant may also have a wireless communication function, in order to realize communication with the multi-purpose conference terminal. For example, the mobile terminal may comprise a mobile phone or a tablet computer.

The display 12 is for displaying conference information. In this embodiment, the conference information may comprise conference-related information and/or conference participant information, such as the conference participants' names, titles, affiliations, and so on, or conference materials, conference schedule, conference seating, etc. A conference main server may transmit information related to the conference participant to a control circuit of the multi-purpose conference terminal through a wireless transmission method, the control circuit may transmit the information related to conference participant to the display device, and the display device may display the information related to the conference participant. The display device may include a liquid crystal display device, an OLED display device, a flexible display device or an electronic paper display device.

Preferably, the control circuit 16 is used to establish communication connection with the corresponding mobile terminal of the conference participant through a wireless communication module 161, and to obtain stored terminal information from the mobile terminal. The display device 12 is used to display the obtained terminal information. The control circuit 16 may find the mobile terminals located nearby through the wireless communication module 161, and from the found mobile terminals located nearby identify the corresponding mobile terminal of conference participant, thus allowing the control circuit 16 to establish communication connection with the corresponding mobile terminal of the conference participant through the wireless communication module 161. The method through which the control circuit 16 obtains terminal information from the mobile terminals may include: the mobile terminal pushes terminal information stored directly to the control circuit 16; or the control circuit 16 sends a request to the mobile terminal, and the mobile terminal, upon receiving the request, returns terminal information 16 to the control circuit. The terminal information may be various types of information stored in the mobile terminal. For example, the terminal information may comprise short messages, WeChat messages or calls, and so on. Thus, in the conference, the conference participant may view and edit the terminal information in the mobile terminal via the multi-purpose conference terminal.

Preferably, the multi-purpose conference terminal communicates with the main server of the conference. The control circuit 16 is used to receive server information from the master server, and to send the server information to the mobile terminal through the wireless communication module 161. The server information may comprise a variety of conference-related information, such as conference materials, conference schedule and/or conference reminders, and so on. In real applications, the server information may also comprise other types of information, which are no longer listed here. The mobile terminal, upon receiving the server information, may display the server information. Thus, the conference participant in the conference may view and edit the server information on the multi-purpose conference terminal via the mobile terminal.

Preferably, the multi-purpose conference terminal comprises a person detection device 17, and the control circuit 16 comprises a first judging module 162 and a recording module 163. The person detection device 17 is used to obtain images and send the obtained images to the first judging module 162; the first judging module 162 is used to determine whether the conference participant has left based on the obtained images. The recording module 163 is used to record conference contents according to preset instructions upon the first judgment module 162 determining that the corresponding conference participant has left. The person detection device 17 can be set on the display device 12, for example, on the top of the display device 12 when the multi-purpose conference terminal is in a bent state and placed normally on the placement surface. Optionally, the person detection device 17 may comprise a binocular camera, that is, two cameras, with a set distance between the two cameras, and the set distance being known. The two cameras and the corresponding conference participant (target) constitute the three vertices of a triangle, each camera captures an image and sends the image to the first judging module 162. According to the two images, the first judging module 162 computes the angle of the target in the two images relative to the cameras respectively. Due to the distance between the two cameras and the set angle are known, the angle between the connection line between the target relative and a camera and the connection line between the two camera can also be calculated, that is, the base of the triangle (the line between the two cameras) and two base angles are known, so the lengths of the other side of the triangle can be calculated. Due to the distance between the two cameras being relatively small, the average of the lengths of the other two sides is close to the distance of the target from the multi-purpose conference terminal. The first judging module 162 determines if the distance is less than or equal to a set threshold. If the distance is less than or equal to the set threshold, it determines that the target is the corresponding conference participant and the conference participant is sitting in front of the multi-purpose conference terminal, that is, determining the conference participant has not left. If determining that the distance is greater than the set threshold, it determines that the target is not the corresponding conference participant and the corresponding conference participant has left. Alternatively, the person detection device 17 may comprise only one camera, which captures an image and sends the image to the first judging module 162. The first judging module 162 calculates the viewing angle of the target formed at the camera according to the area size of the outline of the person in the image, and then estimates the distance between the target in the image and the camera, and judges if the distance between the target and the camera is less than or equal to a set threshold. If the distance is less than or equal to the set threshold, it determines that the target is the corresponding conference participant and the conference participant is sitting in front of the multi-purpose conference terminal, that is, determining that the conference participant has not left. If judging that the distance between the target and the camera is greater than the set threshold, it determines that the target is not the corresponding conference participant and the corresponding conference participant has left. Preferably, when judging the corresponding conference participant has left, the control circuit 16 may control the recording module 163 to record the conference in audio or video according to preset instructions. That is, the record module 163 is configured to record the conference in audio or video when the first judgment module 162 determines that the corresponding conference participant has left, thus allowing automatically recording conference contents when the conference participant leaves the conference hall temporarily.

Optionally, the multi-purpose conference terminal further comprises a physical parameter measurement device 18, and the control circuit 16 comprises a second judging 164 and a reminding module 165. The physical measurement module 4 is used to measure body information of the corresponding conference participant; the second judging module 164 is used to determine the conference participant's physical status based on the physical information; the reminding module 165 is used to issue alert information according to the conference participant's physical state. The physical parameter measurement module 4 can be set on the display device 12. The physical information may comprise eye movements, body temperature and/or complexion. When the physical information is eye movements, the physical parameter measurement module 4 may comprise a camera, which captures the conference participant's eye or eyelid movements. The second judging module 164 judges whether the conference participant's eye or eyelid movement frequency is less than or equal to a set frequency. If judging the eye or eyelid movement frequency is less than or equal to the set frequency, it determines that the conference participant's physical status is fatigued. If judging the eye or eyelid movement frequency is greater than the set frequency, it determines that conference participant's physical status is not fatigued. When the physical information is the body temperature, the physical parameter measurement module 4 may comprises an infrared thermometer, which measures the body temperature of the conference participant. The second judging module 164 may judge whether the conference participant's body temperature is greater than or equal to a set temperature. If judging that the conference participant's body temperature is greater than or equal to the set temperature, it determines the conference participant's physical status is unhealthy. If judging that the body temperature of the conference participant is less than the set temperature, it determines that the physical status of the conference participant is healthy. When the body information is the complexion, the physical parameter measurement module 4 may comprise a camera, which captures the facial images of the conference participant. The second judging module 164 may judge the color value of the facial image of the conference participant. If determining that the color value of the facial image is less than or equal to a set color value, it determines that the conference participant's physical state is unhealthy. If determining that the color value of the facial image is greater than the set color value, it determines that the physical status of the conference participant is healthy. The reminding module 165 is configured to issue alert information when the second judgment module 164 determines that the physical status is fatigued or unhealthy. The alert information may be information reminding the conference controller to control the rhythm of the conference and/or information reminding of the conference participant's physical discomfort. Preferably, the alert information may be sound or text. If the alert information is information reminding the conference controller to control the rhythm of the conference, the alert information can be sent to the main server of the conference.

Preferably, the control module 16 may comprise an interference module 166, which is for causing interference to a mobile terminal under a preset condition. The preset condition may include a confidential conference beginning or the conference entering a confidential stage. Specifically, the interference module 166 may be used to cause interference to mobile network signals of a mobile terminal so that the mobile terminal cannot communicate normally with other communications devices outside the venue.

Preferably, the control circuit 16 comprises an access authentication module 167 for authenticating a mobile terminal, and after authentication, allowing the mobile terminal to communicate other communications devices outside the venue. The access authentication module 167 may be a card information authentication module, wherein after a conference participant with specific permissions swipes the card, the card information authentication module performs access authentication; or the access authentication 167 may be a fingerprint authentication module, wherein after a conference participant with specific permissions presses a fingerprint, the fingerprint authentication module performs access authentication with the fingerprint information. In addition, the access authentication module may also be other authentication modules, such as those of speech recognition, facial recognition, etc.

Preferably, the control circuit 16 comprises a positioning module 168 and an alarm module 169, wherein the positioning module 168 is used to detect the location of the multi-purpose conference terminal; and the alarm module 169 is used to issue alarm information after the positioning module 168 detects that the multi-purpose conference terminal has been taken out of the conference hall within a set period of time, thus allowing the multi-purpose conference terminal to have anti-theft and anti-loss functions. The positioning module for example may be a GPS (Global Positioning System) positioning module, an A-GPS (assisted GPS) module, etc.; and the alarm module for example may be a speaker, a semaphore, a message transmitting module, etc.

In this embodiment, the control circuit may comprise a processor, a memory, an input/output module and a power supply module (not specifically shown in the Figure). The processor may be a CPU chip, the memory may be a memory chip, the input/output module is for information input and output, and the power supply module may comprise a charging circuit and a rechargeable battery. Preferably, the charging circuit may be a wireless charging circuit, and the rechargeable battery may be a lithium-ion battery, a solar rechargeable battery or other types of rechargeable battery. By using the wireless charging circuit in combination with the rechargeable battery to power the multi-purpose conference terminal, the need for power cables is eliminated, which makes the multi-purpose conference terminal more portable. The input and output module can be used in conjunction with a SD card or USB interface, or it can be used in conjunction with a physical keyboard or a virtual touch keyboard, allowing the multi-purpose conference terminal to have a good information input function; the input and output module can be used in conjunction with a display device for video output, or it can be used in conjunction with a speaker for audio output. The control circuit can also be used in conjunction with a voter, a call service module, an identity module, a camera, a simultaneous interpretation module, constituting a comprehensive conference terminal. The multi-purpose conference terminal can interact with participants conveniently through the input and output module.

The control circuit in the multi-purpose conference terminal may comprise a communication module, and the multi-purpose conference terminal may communicate with a mobile terminal of a conference participant through the wireless communication module, thus realizing communication between the multi-purpose conference terminal and the mobile terminal.

Figure 14:
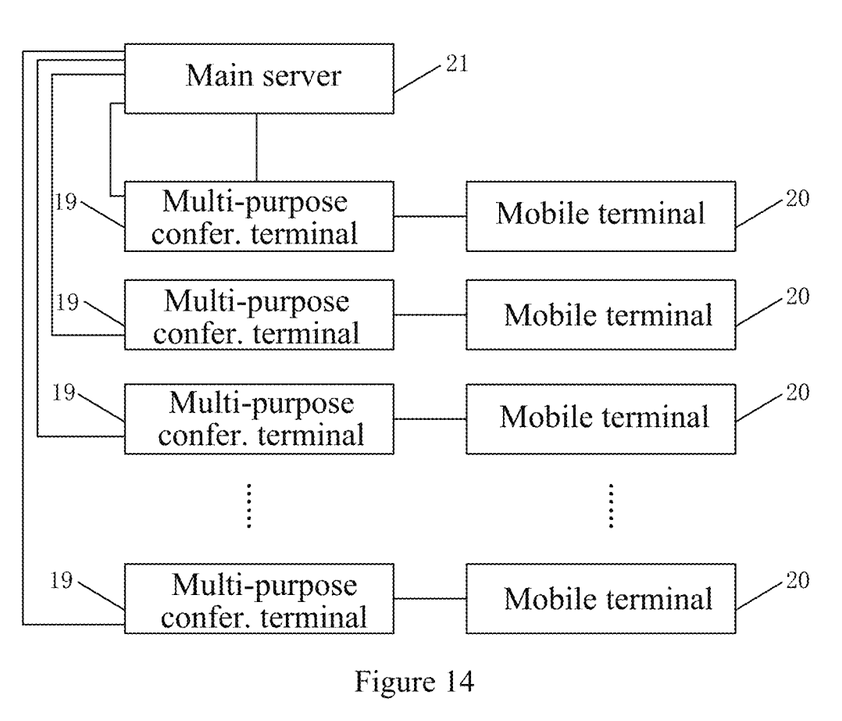
FIG. 14 is a schematic diagram of the structure of a multi-purpose conference system in which the multi-purpose conference terminal provided by this invention is applied.

FIG. 14 is a schematic diagram of the structure of a multi-purpose conference system in which the multi-purpose conference terminal provided by this invention is applied. As shown in FIG. 14, the multi-purpose conference system comprises: a plurality of multiple-purpose conference terminal 19 and at least one mobile terminal 20 of a conference participant corresponding to one of the multi-purpose conference terminals 19. The multi-purpose conference terminal 19 may be a multi-purpose conference terminal provided in first embodiments, and will not be described in detailed here. FIG. 14 shows a solution wherein each multi-purpose conference terminal 5 corresponds to a mobile terminal 20. A multi-purpose conference terminal may communicate with the corresponding mobile terminal of the conference participant through the wireless communication module 161 in its control circuit 16.

Preferably, between the multi-purpose conference terminals 19, instant communication may be performed. Specifically, between the multi-purpose conference terminals 19, instant text communication, instant voice communication or instant video communication may be performed. The multi-purpose conference terminal 19 may display information of all the participants of the conference, and the conference participant using the multi-purpose conference terminal 19 can find out a specific conference participant from all the conference participants according to the information of all the conference participants, and initiate instant communication with the multi-purpose conference terminal 19 that corresponds to the specific conference participant.

Preferably, the multi-purpose conference system further comprises: a main server 21 of the conference for sending commands information or server information to the multi-purpose conference terminals 19, and/or receiving data information from multi-purpose conference terminals 19 and to process the data information, which may be any type of information that needs to be processed by the main server 21.

Preferably, the circuit module 16 of the multi-purpose conference terminal 19 further comprises a guide signal module 30, which is used to issue guide information to guide the conference participant to take seat according to commands information sent by the main server. The guide information may comprise response information and/or display information. For example, the response information may comprise a sound response or a light response, and the display information may be the conference participant's name. In this embodiment, the mobile terminal 20 of the conference participant issues a request for guidance after communicating with the main server; and the master server, after receiving the request for guidance from the mobile terminal 20 of the conference participant, issues commands information instructing the multi-purpose conference terminal corresponding to the mobile terminal 20 to perform guidance.

It is understandable that the implementation described above is only exemplary embodiments to illustrate the principles of the invention, however the invention is not confined to this. For those skilled in the art, variations and improvements can be made without departing from the spirit and substance of the invention, and these variations and improvements are also within the scope of protection of the invention.

The invention claimed is:

1. An electronic table card conference system, comprising one or more electronic table cards, one or more handheld mobile terminals, and a server, wherein
the electronic table card has at least one display area and is configured to obtain conference information from the server and display the conference information in the display area, and to obtain personal information of conference participants from the server and display the personal information in the display area;
the electronic table card is configured to obtain from the handheld mobile terminal instant communication information provided by the handheld mobile terminal, and display the instant communication information in the display area;
the server is configured to pre-store the personal information of the conference participants and the conference information, and send the personal information and the conference information to the electronic table card for display,
wherein said electronic table card further comprises a person detection module and a control circuit;
the person detection module comprises a camera, the camera captures one or more images and sends the obtained one or more images to the control circuit;
the control circuit is configured to determine whether a corresponding conference participant has left based on the obtained images, and record conference contents upon determining that the corresponding conference participant has left.

2. The system according to claim 1, wherein
the electronic table card is a flexible display having a bendable area, wherein the flexible display before bending has one display area, and the flexible display after bending has a first display area and a second display area on both sides of the bendable area;
the electronic table card is configured to display the instant communication information in the first display area, and display the personal information and the conference information in the first display area and/or the second display area.

3. An electronic table card, characterized in that
the electronic table card comprises a flexible display having a bendable area, wherein the flexible display before bending has one display area, and the flexible display after bending has a first display area and a second display area on both sides of the bendable area; and
the electronic table card further comprises a control circuit that obtains from a server conference information and personal information of conference participants, and displays the personal information and the conference information in the first display area and/or the second display area,
wherein said electronic table card further comprises a person detection module,
the person detection module comprises a camera, the camera captures one or more images and sends the obtained one or more images to the control circuit,
the control circuit is configured to determine whether a corresponding conference participant has left based on the obtained images, and record conference contents upon determining that the corresponding conference participant has left.

4. The electronic table card according to claim 3, wherein said control circuit is configured to obtain instant communication information from a mobile terminal, and display said instant communication information in said first display area.

5. A multi-purpose conference terminal, characterized in that the multi-purpose conference terminal includes a flexible display having a bendable area, wherein the flexible display before bending has one display area, and the flexible display after bending has a first display area and a second display area on both sides of the bendable area;

the multi-purpose conference terminal includes a control circuit, the control circuit being configured to obtain instant communication information from a mobile terminal, and obtain conference information and personal information of conference participants from a server, and to display the instant communication information in the first display area, and display the personal information and the conference information in the first display area and/or the second display area, wherein the multi-purpose conference terminal further comprises a person detection module, the person detection module comprises a camera, the camera captures one or more images, and sends the obtained one or more images to the control circuit;

the control circuit is configured to determine whether a corresponding conference participant has left based on the obtained images, and record conference contents upon determining that the corresponding conference participant has left.

* * * * *